United States Patent Office 3,591,337
Patented July 6, 1971

3,591,337
METHOD OF MANUFACTURING SILICON NITRIDE
Roland John Lumbey, Northfield, England, assignor to Joseph Lucas (Industries) Limited, Birmingham, England
No Drawing. Filed Mar. 13, 1968, Ser. No. 712,622
Claims priority, application Great Britain, Apr. 10, 1967, 16,284/67
Int. Cl. C01b *21/06;* B01j *17/20*
U.S. Cl. 23—191           4 Claims

ABSTRACT OF THE DISCLOSURE

Silicon nitride is manufactured by mixing finely divided silicon with finely divided silicon nitride and then heating the resultant mixture in a non-oxidising atmosphere containing nitrogen. The normal way of making silicon nitride is to use finely divided silicon alone, but it is found that the addition of some silicon nitride leads to a reduction in operating time which is considerably greater than the reduction which would be expected because some of the mixture is already constituted by silicon nitride.

---

This invention relates to a method of manufacturing silicon nitride.

A method according to the invention comprises mixing finely divided silicon with finely divided silicon nitride and then heating the resultant mixture in a non-oxidizing atmosphere containing nitrogen.

In one example of the invention a mixture of finely divided silicon and silicon nitride was heated in atmosphere containing 90% nitrogen and 10% hydrogen by volume to produce a mixture containing silicon nitride and less than 1% by weight of uncombined silicon. A control experiment was also performed wherein finely divided silicon was heated in a similar atmosphere at the same temperature to form a similar product. It was found that the mixture of silicon and silicon nitride required a shorter reaction time to produce a given quantity of silicon nitride than did the silicon alone. The reason for this is believed to be that the silicon nitride particles in the mixture prevent sintering of the silicon particles and so allow free access of the nitrogen to the silicon particles.

The following results were obtained in three experiments:

EXPERIMENT 1

150 gms. of finely divided silicon was heated at a temperature of 1275° C. in an atmosphere of 90% nitrogen and 10% hydrogen to give a product consisting of silicon nitride and less than 1% by weight of free silicon. The reaction required a heating time of 57 hours and produced 240 gms. of silicon nitride.

EXPERIMENT 2

A mixture of 100 gms. of finely divided silicon and 50 gms. of finely divided silicon nitride was heated in the same atmosphere used in Experiment 1 at the same temperature to give a similar product. This reaction required a heating time of 16 hours, and produced 160 gms. of fresh silicon nitride.

EXPERIMENT 3

A mixture of 75 gms. of finely divided silicon and 75 gms. of finely divided silicon nitride was heated under the same conditions as those in Experiments 1 and 2 to produce a similar product. This reaction required a heating time of 6½ hours, and produced 120 gms. of fresh silicon nitride.

From the forgoing results it is apparent that as percentage of silicon nitride in the starting mixture is increased the reaction time is decreased. Thus in order to manufacture 480 gms. of silicon nitride the total heating times required in Experiments 1, 2 and 3 respectively, are 114 hours, 48 hours and 26 hours respectively, but of course the number of separate operations, assuming the maximum content of the container is 150 gms., is 2, 3 and 4 respectively. The optimum proportion of silicon nitride to be added will depend on a number of factors, for example the time taken for the container to cool and to be emptied, refilled and reheated, but can readily be determined for a given set of operating conditions.

The three experiments described all produce silicon nitride in the form of a powder which can then be used to form a silicon nitride product. However, such a product can also be formed by reaction sintering, that is by compressing silicon powder to the desired shape and then heating it in a nitriding atmosphere. The invention can also be used in such a process, and it is found that the time taken to form a given product starting from a mixture is considerably less than if the starting material is silicon alone. Moreover, the reduction in time is considerably greater than the reduction which would be expected as a result of reducing the amount of silicon to be nitrided. It has also been found that layer reaction sintered bodies can be manufactured making use of the invention, because deeper nitrogen penetration is possible.

Having thus described my invention what I claim as new and desire to secure by Letters Patent is:

1. In a method of manufacturing silicon nitride wherein finely divided silicon is heated in a non-oxidizing atmosphere containing nitrogen to convert the silicon to silicon nitride, the improvement which comprises adding an effective quantity of finely divided silicon nitride to said silicon prior to heating the resulting mixture to thereby reduce the conversion time of the silicon to silicon nitride.

2. A method as claimed in claim 1 in which the mixture is compressed to a desired shape before heating.

3. A method as claimed in claim 1 wherein from about 33⅓ to about 50% of finely divided silicon nitride is added to said silicon based on the weight of said silicon.

4. A method as claimed in claim 1 wherein heating is continued until the silicon is converted into a product comprising silicon nitride with less than about 1% by weight of free silicon.

References Cited

UNITED STATES PATENTS 1,027,312   5/1912   Bosch et al. _____ 23—191

FOREIGN PATENTS

41/1,404   3/1966   Japan _____ 23—191

OSCAR R. VERTIZ, Primary Examiner

H. S. MILLER, Assistant Examiner

U.S. Cl. X.R.

23—301R